R. A. MOORE.
GARMENT SUPPORTER HOOK.
APPLICATION FILED MAY 23, 1910.
991,795.
Patented May 9, 1911.
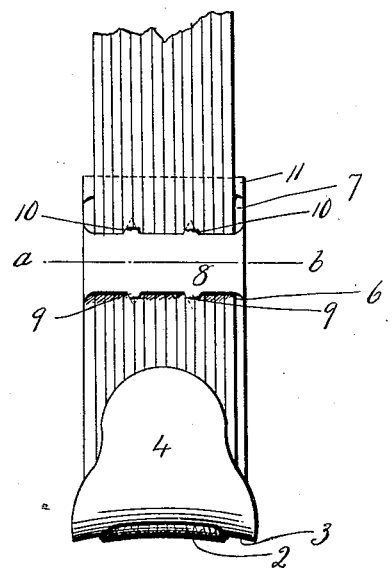
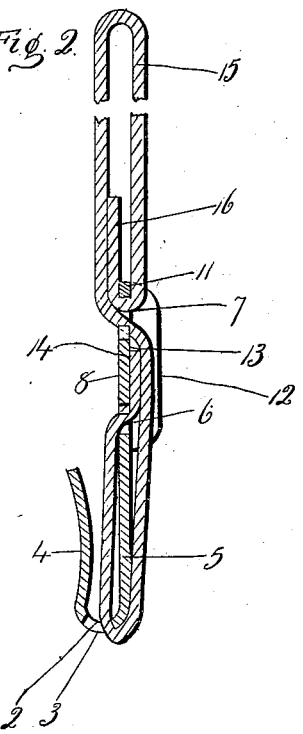
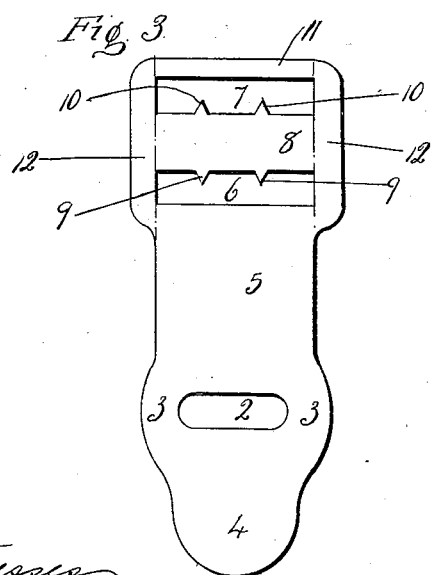
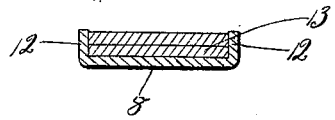

UNITED STATES PATENT OFFICE.

ROSWELL A. MOORE, OF WATERBURY, CONNECTICUT, ASSIGNOR TO WATERBURY BUCKLE CO., OF WATERBURY, CONNECTICUT, A CORPORATION.

GARMENT-SUPPORTER HOOK.

991,795.  Specification of Letters Patent.  Patented May 9, 1911.

Application filed May 23, 1910. Serial No. 562,970.

*To all whom it may concern:*

Be it known that I, ROSWELL A. MOORE, a citizen of the United States, residing at Waterbury, in the county of New Haven and State of Connecticut, have invented a new and useful Improvement in Garment-Supporter Hooks; and I do hereby declare the following, when taken in connection with the accompanying drawings and the letters of reference marked thereon, to be a full, clear, and exact description of the same, and which said drawings constitute part of this specification, and represent, in—

Figure 1 a view in front elevation showing a garment-supporter hook constructed in accordance with my invention and shown as applied to a piece of webbing. Fig. 2 a view thereof in vertical section. Fig. 3 a plan view showing a "development" of the blank from which the hook is formed. Fig. 4 a sectional view on the line *a—b* of Fig 1.

My invention relates to an improvement in garment-supporter hooks designed with particular reference to being used in "trimming" men's garters in which the webbing is attached at one end to a garment-supporter and at the other end to a hook, the object of my present invention being to construct the hook with particular reference to having its back covered with webbing.

With these ends in view my invention consists in a garment-supporter having certain details of construction as will be hereinafter described and pointed out in the claim.

In carrying out my invention I form a webbing-opening 2 in the apex of the bend 3 produced between the beak 4 and the plate-like body 5 of the hook, the said webbing-opening 2 providing for covering the back of the hook with webbing so as to protect it from the moisture of the body and prevent it from rusting. As shown, the body 5 of the hook is formed toward its upper end with webbing-openings 6 and 7 located on the opposite sides of a bar 8 from which teeth 9 project downward into the opening 6, and teeth 10 project upward into the opening 7, the upper end of which is closed by a cross-bar 11. Wing-like flanges or extensions 12 formed at the upper end of the body 5 and turned rearward at a right angle therefrom, furnish a shallow recess 13 at the back of the upper end of the hook for the reception of the webbing. The end 14 of a short length of narrow webbing is passed from front to rear through the opening 6 as clearly shown in Fig. 2. The webbing is then carried downward into the hook in front of the outer face of the lower end of its body 5, and then through the opening 2 in the bend of the hook after which it is carried up back of the body of the hook over the end 14 of the webbing as also shown in Fig. 2. The webbing is then passed from rear to front through the opening 7, then turned upon itself to form a loop 15, and then downward and from rear to front through the opening into the loop 15 in which the end 16 then lies as shown in Fig. 2, from which it appears that no metal at the back of the hook is exposed.

I claim:—

The combination with a garment-supporter hook having webbing-openings formed respectively in the bend of the hook and in the body or shank of the hook, of a length of webbing passed from rear to front through the webbing-opening in the body of the hook, then downward through the opening in the bend of the hook, then upward over the back of the hook.

In testimony whereof, I have signed this specification in the presence of two subscribing witnesses.

ROSWELL A. MOORE.

Witnesses:
WM. F. AVERY,
HARRY C. COOLEY.

Copies of this patent may be obtained for five cents each, by addressing the "Commissioner of Patents, Washington, D. C."